United States Patent [19]

Ribka et al.

[11] 4,124,582

[45] Nov. 7, 1978

[54] PROCESS FOR THE PURIFICATION OF AZO PIGMENTS BY STIRRING AN AQUEOUS, ALKALINE SUSPENSION OF CRUDE PIGMENT

[75] Inventors: Joachim Ribka, Offenbach am Main; Wolfgang Rieper, Frankfurt am Main, both of Fed. Rep. of Germany

[73] Assignee: Hoechst Aktiengesellschaft, Frankfurt am Main, Fed. Rep. of Germany

[21] Appl. No.: 616,668

[22] Filed: Sep. 25, 1975

Related U.S. Application Data

[63] Continuation of Ser. No. 434,003, Jan. 17, 1974, abandoned.

[30] Foreign Application Priority Data

Jan. 19, 1973 [DE] Fed. Rep. of Germany ....... 2302517

[51] Int. Cl.$^2$ ...................... C09B 43/00; C09B 46/00
[52] U.S. Cl. ................................ 260/208; 106/288 Q; 106/308 Q; 106/308 N; 106/311; 260/176; 260/193

[58] Field of Search ............... 260/208, 176, 193, 203, 260/204; 106/288 Q, 308 Q, 308 N, 211

[56] References Cited

U.S. PATENT DOCUMENTS

| 3,004,821 | 10/1961 | Gano | 260/208 X |
|---|---|---|---|
| 3,056,642 | 10/1962 | Kesler et al. | 260/208 X |
| 3,071,815 | 1/1963 | Mackinnon | 260/208 X |
| 3,124,565 | 3/1964 | Schilling et al. | 260/157 |
| 3,137,686 | 6/1964 | Dietz et al. | 260/157 |
| 3,169,955 | 2/1965 | Siebert et al. | 260/176 |

*Primary Examiner*—Floyd D. Higel
*Attorney, Agent, or Firm*—Curtis, Morris & Safford

[57] ABSTRACT

A process for the purification of azo pigments, wherein the crude pigment is stirred for some time in an aqueous alkaline suspension in a pH range from 9 to 12, preferably from 11 to 12, at temperatures between 20° to 80° C and subsequently the crude pigment is filtered off and washed neutral. The pigments treated by this process show a clearer and more brilliant shade and are faster to bleeding when incorporated, for example, into a thermoplastic material than the untreated pigments.

6 Claims, No Drawings

PROCESS FOR THE PURIFICATION OF AZO PIGMENTS BY STIRRING AN AQUEOUS, ALKALINE SUSPENSION OF CRUDE PIGMENT

This is a continuation of application Ser. No. 434,003, filed Jan. 17, 1974. now abondoned.

It has been shown that azo pigments which are suitable for use as lacquers because of their high hiding power, good rheological properties and high luster effect in stoving lacquers, are in general obtainable only by a thermal after-treatment of the crude pigments obtained after synthesis in a mixture of water and an organic solvent. The temperatures almost always required in this process range between 120° and 150° C. and must often be maintained for several hours. These conditions very frequently result in undesired side reactions. As a consequence thereof, there occur, for example, deteriorations of the fastness characteristics of the pigment and/or color alterations from clear to full or dark shades. If, for example, the bright-yellow pigment of the formula

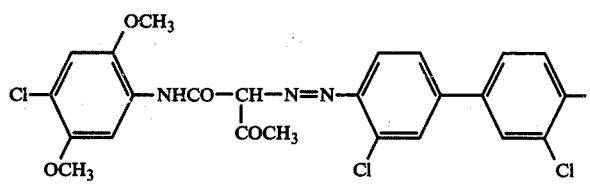

as a wet filter presscake obtained after coupling is heated for 1 hour to 130° C. in a mixture of chlorobenzene and water — in order to convert it into pigment form with the optimal hiding power — a dull-yellow to olive-green pigment with very poor fastness to overlacquering is obtained. In the case of the disazo pigment of the chemical consitution

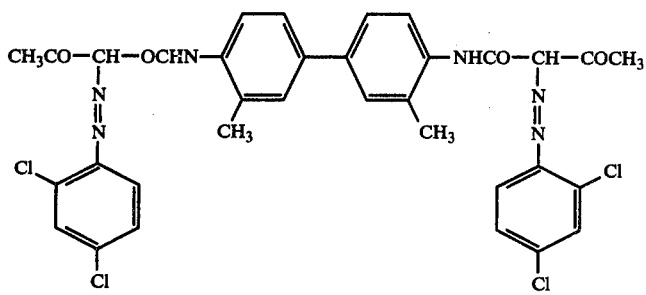

it was found that after thermal treatment of the pigment obtained upon coupling in an aqueous neutral medium at 150° C. for several hours, the clear yellow shade becomes turbid. Furthermore, the high content of aromatic amines occuring after the thermal treatment inhibits the use of this pigment for the dyeing of textile materials.

In addition to the defects already mentioned, such as diminished fastness to bleeding, dullness of shade and contaminations caused by by-products, bleeding phenomena may occur in the case of thermally aftertreated azo pigments during the dyeing of high-molecular material or alterations of these materials may take place due to secondary reactions with contaminants in the pigments.

Now, a process has been found for the purification of azo pigments, wherein the crude pigment is stirred for some time in an aqueous alkaline suspension within a pH range of 9 to 12, preferably 11 to 12, at temperatures from 20° to 80° C., the crude pigment is separated by filtration and washed neutral.

This process is suitably carried out by alkalizing the pigment suspension obtained after coupling; however, it is possible to stir the crude pigment — which has been isolated from the coupling suspension and is in a wet state and washed free of salt — into the aqueous solution of a base. Generally, alkali hydroxides are used as bases. The length of treatment varies between half an hour and several hours. The pigment concentration of the alkaline suspension is to be chosen in such a way that intensive stirring is possible. Subsequent to the alkaline treatment, the pigment is isolated by filtration and washed neutral with water that has been heated to the temperature chosen for the alkaline treatment. The aqueous and wet pigment paste thus obtained can, in order to be converted into a pigment form with great hiding power, even be subjected to a thermal aftertreatment lasting several hours at temperatures above 100° C. in a mixture and an organic solvent, without deterioration of the coloristic and fastness properties or unduly contaminating the pigment.

The process according to this invention is basically suitable for the purification of all known azo pigments.

This process is of special importance in the case of those azo pigments, the industrial application of which may be impaired by the presence of contaminants.

EXAMPLE 1

An 8 % aqueous suspension of the coupling product of 3.3'-dichlorobenzidine and two equivalents of 1-acetoacetylamino-4-chloro-2,5-dimethoxy-benzene were combined with a 33 % sodium hydroxide solution until a pH value of 12 was reached, then the whole was heated for 1 hour to about 50° C., the pigment was separated by filtration and washed neutral with warm water having a temperature of 50° C. 200 grams of the approx. 20 % dyestuff paste thus obtained were suspended in 250 ml of water and after adding 400 ml of chlorobenzene, the suspension was heated in a closed vessel for 1 hour up to 130° C. After cooling down to 90° C., the chlorobenzene was distilled off by introducing steam and the pigment was separated by filtration from the remaining aqueous suspension. By incorporating the dried and ground dyestuff into an alkyd melamine resin lacquer by means of a paint shaker, by subsequent coating of the pigmented lacquer on card-board with black or white ground-shade, and by stoving the whole for 30 minutes at 140° C., bright-yellow lacquerings with high hiding power were obtained. The lacquerings were distinguished by excellent fastness to light and good fastness to overlacquering.

In contrast to this process, a dull yellow-green product was obtained after thermal treatment of the disazo pigment, the product showing poor fastness to overlacquerizing when the crude pigment was not subjected to the preliminary alkaline purification.

EXAMPLE 2

The pigment which had been isolated and washed free of salt after the coupling of bisdiazotized 2,4-dichloroaniline with a half equivalent of 4,4'-bis-(acetoacetly-amino)-3,3'-dimethyl-benzidine, was stirred in water in order to form a 10 % suspension. It was heated to 55° C., then 5 % by weight of a 33 % sodium hydroxide solution as related to the amount of pigment used, were added. After stirring for one hour at 50° to 55° C., the yellow pigment was separated by filtration and washed neutral with warm water at 60° C. The product thus purified was heated for 8 hours to 150° C. in a 6 % aqueous suspension to which 5 % by weight of o-dichloro-benzene as related to the amount of pigment used were added. The pigment obtained in this manner was characterized by high hiding power and contained less than 0.05 % of aromatic amines.

When, however, the crude pigment was subjected to the described thermal treatment without the alkaline purification, the pigment so obtained showed a turbid shade and contained about 1 % or aromatic amines.

We claim:

1. A process for the purification of an azo pigment which comprises stirring a suspension of the crude pigment in water adjusted to a pH-valve of 9 to 12 at a temperature of 20° to 80° C., isolating the pigment and washing it neutral.

2. A process as defined in claim 1, wherein the pH is adjusted with an alkali metal hydroxide.

3. A process as defined in claim 1, wherein the suspension obtained after coupling is adjusted to said pH-value.

4. A process as defined in claim 1, wherein the crude pigment is isolated from the coupling suspension, is washed free of salt and is stirred into the aqueous solution of a base.

5. A process as defined in claim 1, wherein the pigment concentration in said suspension allows intensive stirring.

6. A process as claimed in claim 1, wherein the pH-value of the aqueous suspension is from 11 to 12.

* * * * *